United States Patent Office.

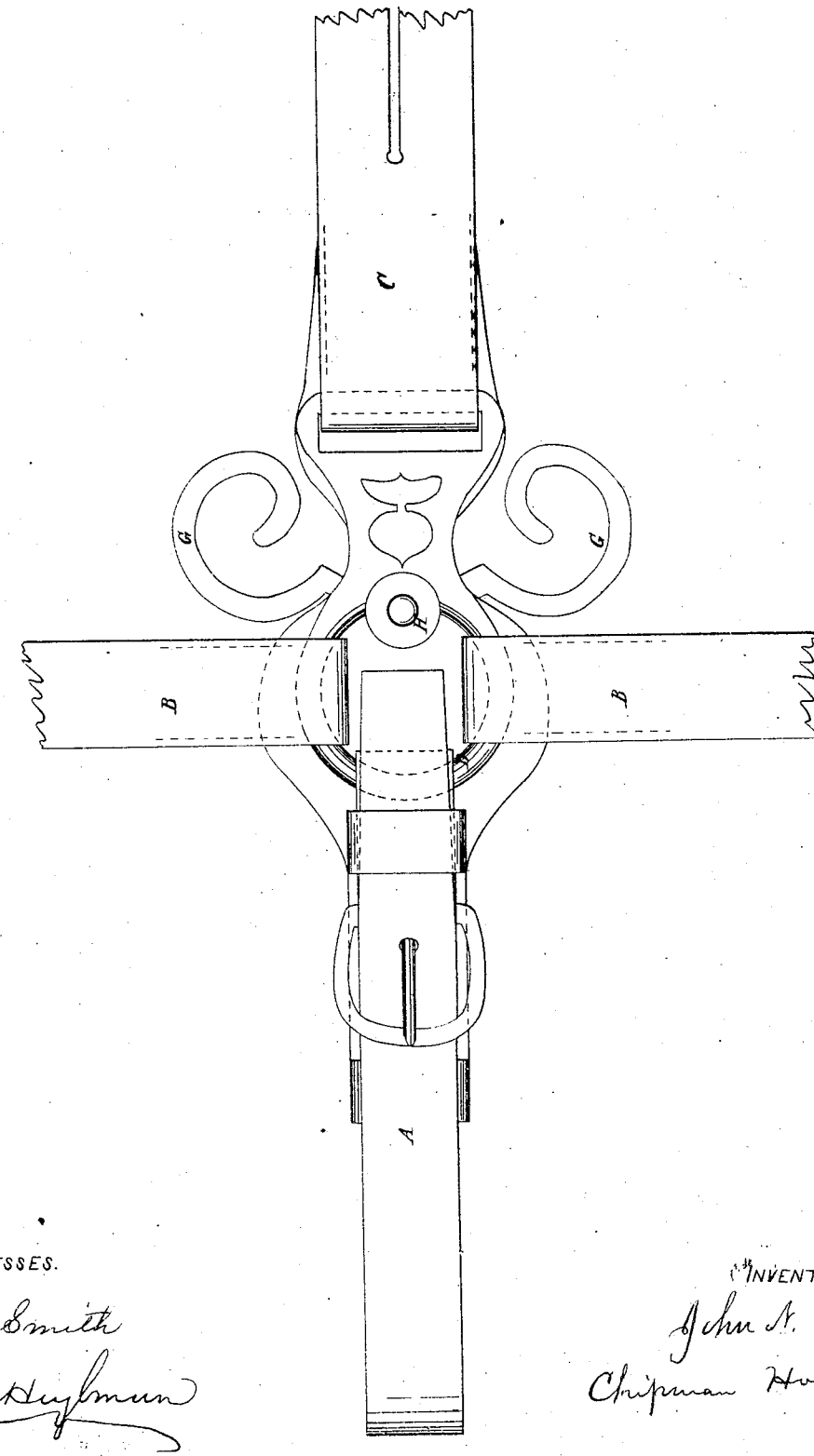

JOHN N. GUGER, OF PEORIA, ILLINOIS.

Letters Patent No. 75,157, dated March 3, 1868.

IMPROVEMENT IN TUG AND CHAIN-CARRIERS.

The Schedule referred to in these Letters Patent and making part of the same.

TO WHOM IT MAY CONCERN:

Be it known that I, JOHN N. GUGER, of Peoria, in the county of Peoria, and State of Illinois, have invented a new and valuable Improvement in Chain and Tug-Carriers; and I do hereby declare that the following is a full, clear, and exact description of the construction and operation of the same, reference being had to the annexed drawings, making a part of this specification, and to the letters of reference marked thereon.

The nature of my invention consists in providing means for carrying the rear ends of the tugs or chains of a harness, when the animal on which the harness is placed is not attached to the carriage.

My device not only serves the purpose mentioned, but, at the same time, it provides an additional metallic ornament to a harness.

My invention consists in constructing a brass, silver, or other metallic attachment of a harness in the form shown on the drawings, and adjusting it to the harness immediately over the small of the animal's back, where a ring is sometimes used to connect the back-strap with the crupper and hip-straps.

On the drawings, the letter A represents the back-strap of the harness, letter B the hip-straps, and letter C the crupper-straps. I usually attach a leather pad to said straps to keep the "carrier" from the skin of the animal, but this is not very important. If the "carrier" be well made and smoothly finished, it will not very readily chafe the animal's skin. The letter D represents a ring, to which the back-strap and hip-straps are attached. This ring is extended rearward, in the manner and form shown on the drawings, and at its extreme rear end is an aperture to receive the crupper-strap. This extension of ring D is also slotted at the point, contiguous to the hooks G, hereinafter mentioned, to furnished space for the forward and backward movement of the same. Letter G represents the hooks. I place one of these on each side of the ring-extension, in the manner shown on the drawings. Letter H is a pivot-pin that passes through the hooks G, and holds them to the ring. It also furnishes means for the backward and forward movement of said hooks, at the will of the operator.

My tug-carrier is operated as follows: Whenever it is found desirable to move the animal any distance with the harness on, I take the cock-eye of the tug or the link of the chain, as the case may be, and hang it on the hook G. By simply drawing the tug or chain within the hook the purpose will be served in cases where the distance to be travelled is not great.

It is unnecessary to enumerate all the advantages accruing from the use of my tug and chain-carrier, as they will readily present themselves to any thinking, observant mind. It is sufficient for me to state that, in actual use, I find it a neat, useful, and highly-ornamental attachment to a harness.

What I claim as my invention, and desire to secure by Letters Patent, is—

A tug and chain-carrier attachment for a harness, constructed in the form herein shown and described, and having hooks G and pivot-pin H combined therewith, all arranged and operating as specified.

JOHN N. GUGER.

Witnesses:
R. EUION,
EUGENE McCUNE.